(12) United States Patent
Fukuda et al.

(10) Patent No.: US 10,373,607 B2
(45) Date of Patent: *Aug. 6, 2019

(54) TESTING WORDS IN A PRONUNCIATION LEXICON

(71) Applicant: INTERNATIONAL BUSINESS MACHINES CORPORATION, Armonk, NY (US)

(72) Inventors: Takashi Fukuda, Tokyo (JP); Osamu Ichikawa, Tokyo (JP); Futoshi Iwama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,778

(22) Filed: Jun. 13, 2017

(65) Prior Publication Data

US 2017/0278509 A1 Sep. 28, 2017

Related U.S. Application Data

(63) Continuation of application No. 14/755,854, filed on Jun. 30, 2015, now Pat. No. 9,734,821.

(51) Int. Cl.
*G10L 13/08* (2013.01)
*G10L 15/01* (2013.01)
*G10L 15/193* (2013.01)

(52) U.S. Cl.
CPC .............. *G10L 15/01* (2013.01); *G10L 13/08* (2013.01); *G10L 15/193* (2013.01)

(58) Field of Classification Search
None
See application file for complete search history.

(56) References Cited

U.S. PATENT DOCUMENTS 6,622,121 B1 9/2003 Crepy et al.
9,292,489 B1 * 3/2016 Sak .................... G06F 17/2785
(Continued)

FOREIGN PATENT DOCUMENTS

EP 1647969 4/2006
JP 2005-84102 3/2005
(Continued)

OTHER PUBLICATIONS

Rusko, et al., "Test Signals Generator for ASR Under Noisy and Reverberant Conditions Using Expressive TTS", Institute of Informatics, Slovak Academy of Sciences, Bratislava, Slovakia, Forum Acusticum, Sep. 2014, pp. 1-6.
(Continued)

*Primary Examiner* — Marcus T Riley
(74) *Attorney, Agent, or Firm* — Tutunjian & Bitetto, P.C.; Vazken Alexanian (57) ABSTRACT

A method, for testing words defined in a pronunciation lexicon used in an automatic speech recognition (ASR) system, is provided. The method includes: obtaining test sentences which can be accepted by a language model used in the ASR system. The test sentences cover words defined in the pronunciation lexicon. The method further includes obtaining variations of speech data corresponding to each test sentence, and obtaining a plurality of texts by recognizing the variations of speech data, or a plurality of texts generated by recognizing the variation of speech data. The method also includes constructing a word graph, using the plurality of texts, for each test sentence, where each word in the word graph corresponds to each word defined in the pronunciation lexicon; and determining whether or not all or parts of words in a test sentence are present in a path of the word graph derived from the test sentence.

20 Claims, 8 Drawing Sheets

(56) References Cited

U.S. PATENT DOCUMENTS

| | | | |
|---|---|---|---|
| 9,710,463 B2* | 7/2017 | Prasad | G06F 17/289 |
| 9,734,821 B2* | 8/2017 | Fukuda | G10L 15/01 |
| 2003/0191625 A1* | 10/2003 | Gorin | G06F 17/278 |
| | | | 704/1 |
| 2006/0271366 A1 | 11/2006 | Bruckman | |
| 2007/0265826 A1* | 11/2007 | Chen | G06F 17/2818 |
| | | | 704/2 |
| 2008/0120102 A1* | 5/2008 | Rao | G10L 15/22 |
| | | | 704/235 |
| 2008/0133245 A1* | 6/2008 | Proulx | G06F 17/2818 |
| | | | 704/277 |
| 2014/0297252 A1* | 10/2014 | Prasad | G06F 17/289 |
| | | | 704/2 |
| 2015/0255069 A1* | 9/2015 | Adams | G10L 15/08 |
| | | | 704/236 |
| 2017/0004823 A1* | 1/2017 | Fukuda | G10L 15/01 |
| 2017/0278509 A1* | 9/2017 | Fukuda | G10L 15/01 |
| 2018/0165554 A1* | 6/2018 | Zhang | G06N 3/04 |

FOREIGN PATENT DOCUMENTS

| | | |
|---|---|---|
| JP | 2007-33671 | 2/2007 |
| JP | 2013-218095 | 10/2013 |

OTHER PUBLICATIONS

U.S. Appl. No. 14/755,854, filed Jun. 30, 2015, 2017-0004823.

List of IBM Patents or Patent Applications Treated as Related dated Jun. 13, 2017, 2 pages.

* cited by examiner

Example of a language model based on
a context free grammar for audio-control

| A grammar for simple audio-control file-viewer | | | |
|---|---|---|---|
| Syntax | | | Probability |
| • S | ::= | I C E 1.0 | |
| • I | ::= | "run" "file" "viewer" | 0.2 |
| | | "afv" "start" | 0.8 |
| • E | ::= | "afv" "stop" | 0.4 |
| | | "shutdown" | 0.6 |
| | | " " | 0.05 |
| • C | ::= | "next" | 0.25 |
| | | "back" | 0.1 |
| | | "mark" | 0.1 |
| | | "store" | 0.1 |
| | | C C | 0.3 |
| | | O | 0.1 |
| • O | ::= | "open" C "close" | 0.6 |
| | | "preview" C | 0.4 |

TESTING WORDS IN A PRONUNCIATION LEXICON

BACKGROUND

The present invention relates to a speech recognition system, and specifically, to a test solution for an automatic speech recognition (ASR) system. A test has been performed in view of recognition accuracy or robustness of a speech recognition system. In the test, a large-scale of utterance data is utilized as test data for a validation of robustness.

SUMMARY

According to an aspect of the present invention, an embodiment of the present invention provides a method performed in one or more of computers, for testing words defined in a pronunciation lexicon used in an automatic speech recognition (ASR) system. The method includes obtaining a plurality of test sentences which can be accepted by a language model used in the ASR system, where the test sentences cover the words defined in the pronunciation lexicon. The method further includes obtaining variations of speech data corresponding to each of the test sentences. The method also includes obtaining a plurality of texts by recognizing the variations of speech data, or a plurality of texts generated by recognizing the variation of speech data. The method additionally includes constructing a word graph, using the plurality of texts, for each of the test sentences, where each word in the word graph corresponds to each of the words defined in the pronunciation lexicon. The method also includes determining whether or not all or parts of words in a test sentence of the test sentences are present in a path of the word graph derived from the test sentence.

According to another aspect of the present invention, an embodiment of the present invention provides a computer system for testing words defined in a pronunciation lexicon. The computer system includes an automatic speech recognition (ASR) system for using the pronunciation lexicon. The ASR system is configured to generate a plurality of test sentences which can be accepted by a language model used in the ASR system. The test sentences cover the words defined in the pronunciation lexicon. The computer system further includes a text-to-speech (TTS) system configured to generate variations of speech data corresponding to each of the test sentences. The ASR system is further configured to recognize the variations of speech data to obtain a plurality of texts. The ASR system is further configured to construct a word graph, using the plurality of texts, for each of the test sentences, wherein each word in the word graph corresponds to each of the words defined in the pronunciation lexicon. The computer system is further configured to determine whether or not all or parts of words in a test sentence of the test sentences are present in a path of the word graph derived from the test sentence.

According to another aspect of the present invention, an embodiment of the present invention provides a computer program product comprising a computer readable storage medium storing a program of instructions executable by the computer system to perform one or more methods described herein also may be provided.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
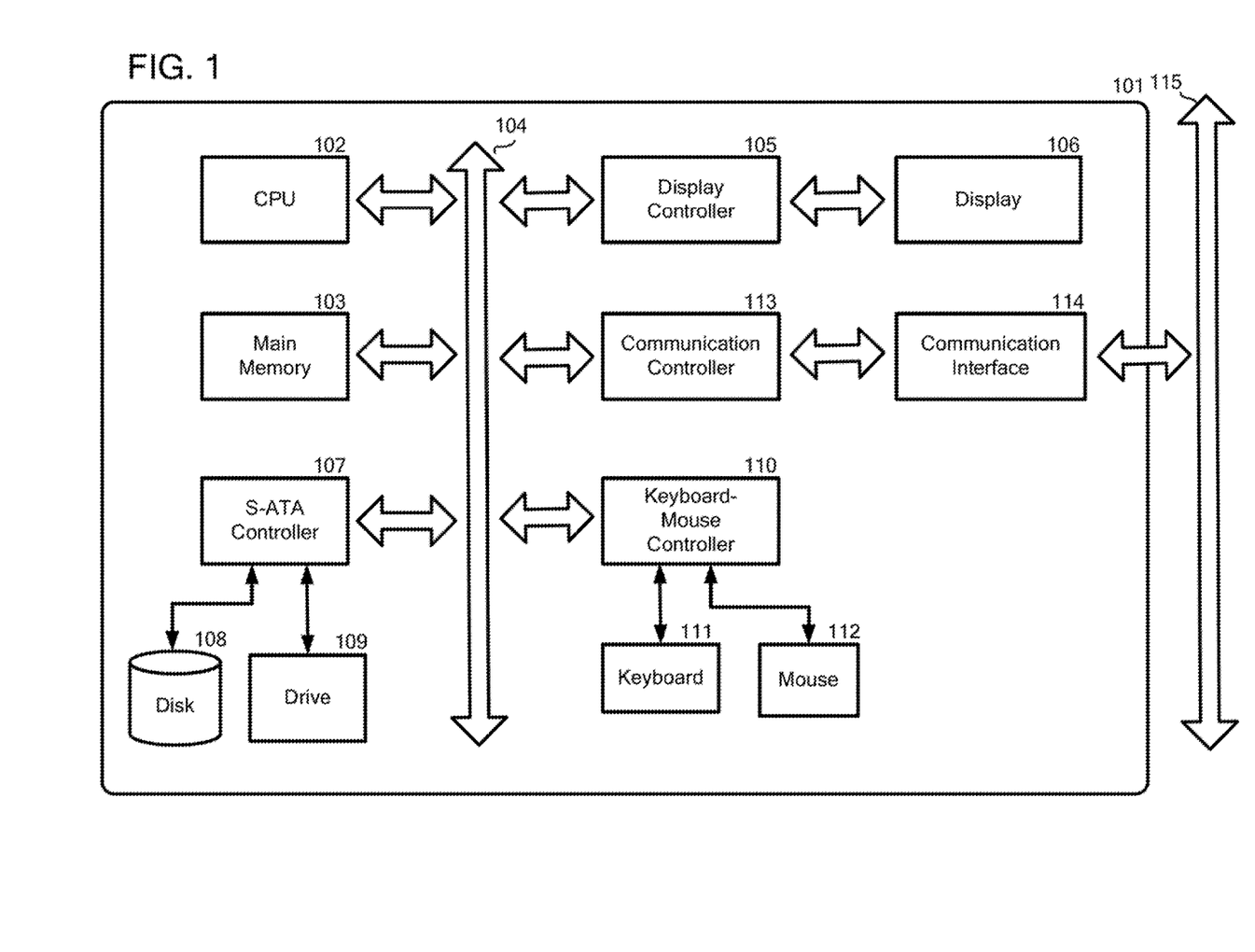
FIG. 1 illustrates an exemplified basic block diagram of a computer hardware used in an embodiment of the present invention.

FIG. 1 illustrates exemplified basic block diagrams of a computer hardware used in an embodiment of the present invention.

With reference now to FIG. 1, a computer 101 may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer 101 comprises one or more CPUs 102 and a main memory 103 connected to a bus 104. The CPU 102 is preferably based on a 32-bit or 64-bit architecture. The CPU 102 is, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display 106 such as a liquid crystal display (LCD) may be connected to the bus 104 via a display controller 105. The display 106 may be used to display, for management of the computer(s), information on a computer connected to a network via a communication line and information on software running on the computer using an appropriate graphics interface. A disk 108 such as a hard disk or a solid state drive, SSD, and a drive 109 such as a CD, a DVD, or a BD (Blu-ray disk) drive may be connected to the bus 104 via an SATA or IDE controller 107. Moreover, a keyboard 111 and a mouse 112 may be connected to the bus 104 via a keyboard-mouse controller 110 or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data is stored in the disk 108 to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive 109 may be used to install a program, such as the computer program of an embodiment of the present invention, readable from a CD-ROM, a DVD-ROM, or a BD to the disk 108 or to load any data readable from a CD-ROM, a DVD-ROM, or a BD into the main memory 102 or the disk 108, if necessary.

A communication interface 114 may be based on, for example, but is not limited to, the Ethernet® protocol. The communication interface 114 may be connected to the bus 104 via a communication controller 113, physically connects the computer 101 to a communication line 115, and may provide a network interface layer to the TCP/IP communication protocol of a communication function of the operating system of the computer 101. In this case, the communication line 115 may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2:
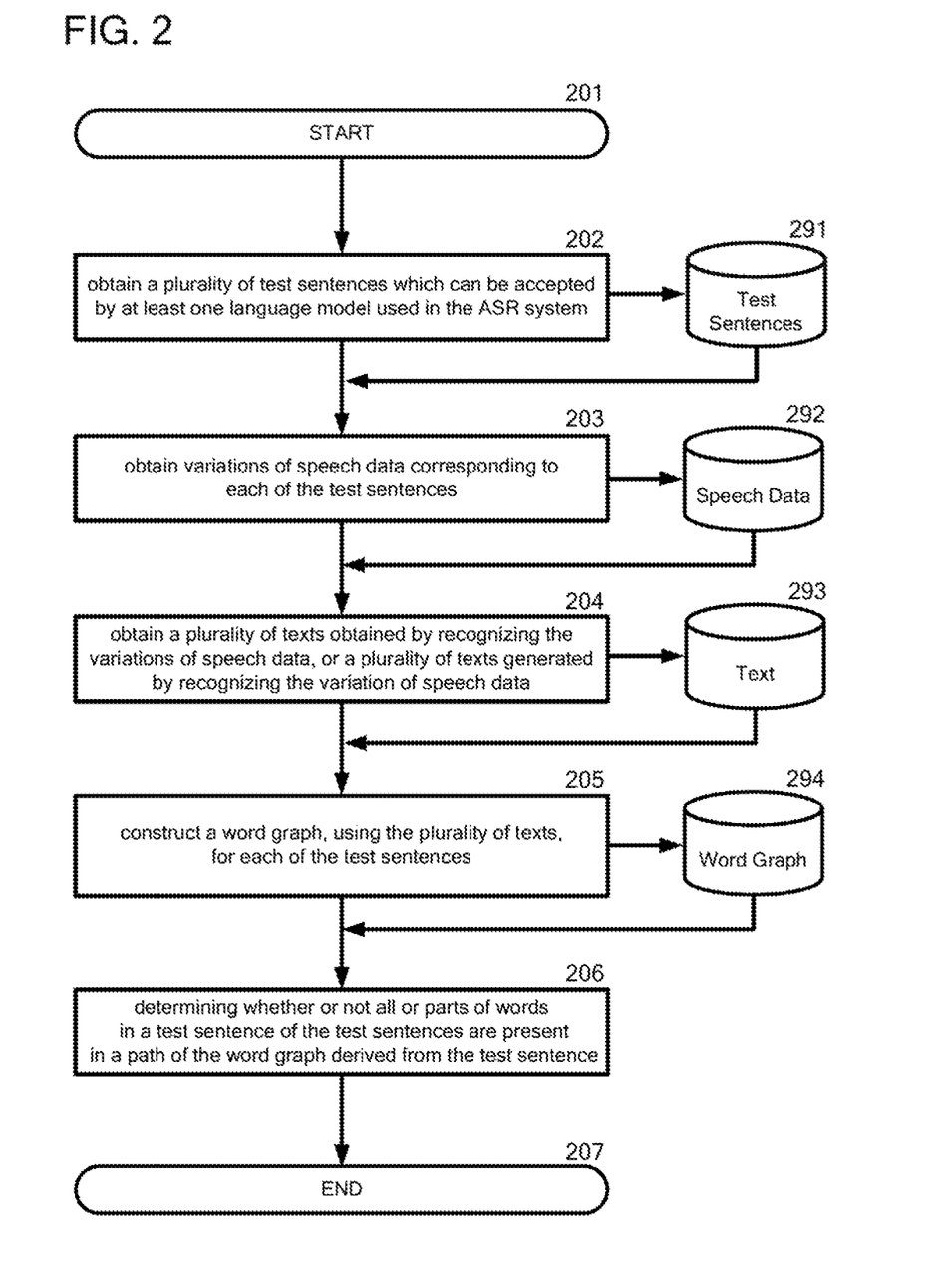
FIG. 2 illustrates one embodiment of a flowchart of a process for testing words defined in a pronunciation lexicon used in an ASR system.

FIG. 2 illustrates one embodiment of a flowchart of a process for testing words defined in a pronunciation lexicon used in an ASR system.

In step 201, the computer 101 starts the process of an embodiment of the present invention for testing words defined in a pronunciation lexicon used in an ASR system.

In step 202, the computer 101 obtains a plurality of test sentences which can be accepted by a language model used in the ASR system. The computer 101 may obtain the plurality of the test sentences generated by the computer 101 or the plurality of the test sentences generated by another computer (not shown). In one embodiment, the computer 101 generates, by the ASR system, a plurality of test sentences which can be accepted by the language model used in the ASR system.

The computer 101 may associate one test sentence with the feature information obtained from the language model in the ASR system. For each of the plurality of test sentences 291, the computer 101 may generate the test sentence associated with the feature information obtained from the language model in the ASR system.

The language model may be any language model that can create a reference text. In the present specification, "a language model" should be understood to mean one language model or a plurality of language models. The language model may be, for example, but is not limited to, Finite State Transducer (FST) or Context Free Grammar (CFG). Each of the embodiments of the FST and the CFG will be shown in FIGS. 3 and 4 mentioned below, respectively.

The plurality of the test sentences can be generated based on the FST, for example, according to the following literature, John E. Hoperoft et. al., "Introduction to Automata Theory, Languages, and Computation $2^{nd}$ Edition", Addison-Wesley Publishing Company, 2000, especially see the section, "3 Regular Expressions and Languages", "3.2 Finite Automata and Regular Expressions", "3.2.1 From DFA's to Regular Expressions", "3.2.2 Converting DFA's to Regular Expressions by Eliminating States", and "3.2.3 Converting Regular Expressions to Automata", in which an algorithm for converting a Finite state automaton, corresponding to the FST, to a regular language, the entire disclosure of which is incorporate by reference as if fully set forth herein. The algorithm for converting a Finite state automaton lists paths covering all edges between 2 nodes. Accordingly, if a start node and an end node are taken, the set of paths covering all edges between the star node and the end node, i.e., a plurality of test sentences, is generated.

The generated test sentences cover the words defined in the pronunciation lexicon. In one embodiment, the generated test sentences cover all of the words defined in the pronunciation lexicon. In one embodiment, the generated test sentences may cover all of partial structures of the language model. In one embodiment, the partial structures of the language model may be edges in the FST, or production rules and alternatives of each rule in the CFG. In the CFG, each alternative may correspond to a right-hand side choice of production rule.

The feature information may be obtained from the FST, for example, by scanning the FST by the computer 101, if the FST is used as the language model. The feature information may comprise (i) the number of transitions to other words in the language model, (ii) a transition probability among words in the language model, or (iii) a combination of (i) and (ii). The number of transitions to other words in the language model may be, for example, the number of transitions to other word, from each word comprised in the test sentence through linked edges connected to the word in the FST. The transition probability among words in the language model may be, for example, a transition probability in the FST of transitions to each word comprised in the sentence. The feature information may be indicated as, for example, "a word" in the language model/the transition number/a transition probability; "a word" in the language model/the transition number or "a word" in the language model/a transition probability. The feature information will be utilized in order to generate variations of speech data having acoustic variations. Some embodiments of the test sentences associated with the feature information will be shown in FIGS. 3B and 4B mentioned below.

The computer 101 may store the generated test sentences into a storage 291, such as the disk 108 described in FIG. 1.

In step 203, the computer 101 obtains variations of speech data corresponding to each of the test sentences obtained in step 202. The computer 101 may obtain the variations of speech data generated by the computer 101 or generated by another computer (not shown). In one embodiment, the computer 101 generates, by a text-to-speech (TTS) system, variations of speech data corresponding to each of the generated test sentences. The variations of speech data may be a set of test speech data. The computer 101 may associate the variations of speech data with a test sentence from which the variations of speech data are generated. The associated test sentence is also called as "a correct sentence".

In one embodiment, the computer 101 may determine the number of the variation of speech data by reading a predefined number, such as 2, 3, or more. In another embodiment, the computer 101 may determine the number of the variations of speech data according to the corresponding feature information. The number of the variation of speech data is determined by setting any function, such as a logarithmic function, deriving a return value from an input of the branch number or a transition probability among words in the language model as an input, and converting the return value into an integer.

The computer 101 may store the generated variations of speech data into a storage 292, such as the disk 108 described in FIG. 1. The storage 292 may be the same or different with the storage 291.

In step 204, the computer 101 obtains a plurality of texts by recognizing the variation of speech data obtained in step 203, or a plurality of texts generated by recognizing the variation of speech data obtained in step 203. The computer 101 may obtain the plurality of texts by recognizing the variation of speech data by the computer 101. The computer 101 may obtain the plurality of texts generated by recognizing the variation of speech data from another computer (not shown). In one embodiment, the computer 101 recognizes, by the ASR system, the variations of speech data to obtain a plurality of texts.

The computer 101 may store the plurality of texts into a storage 293, such as the disk 108 described in FIG. 1. The storage 293 may be the same or different with the storage 291 or the storage 292.

Figure 5:
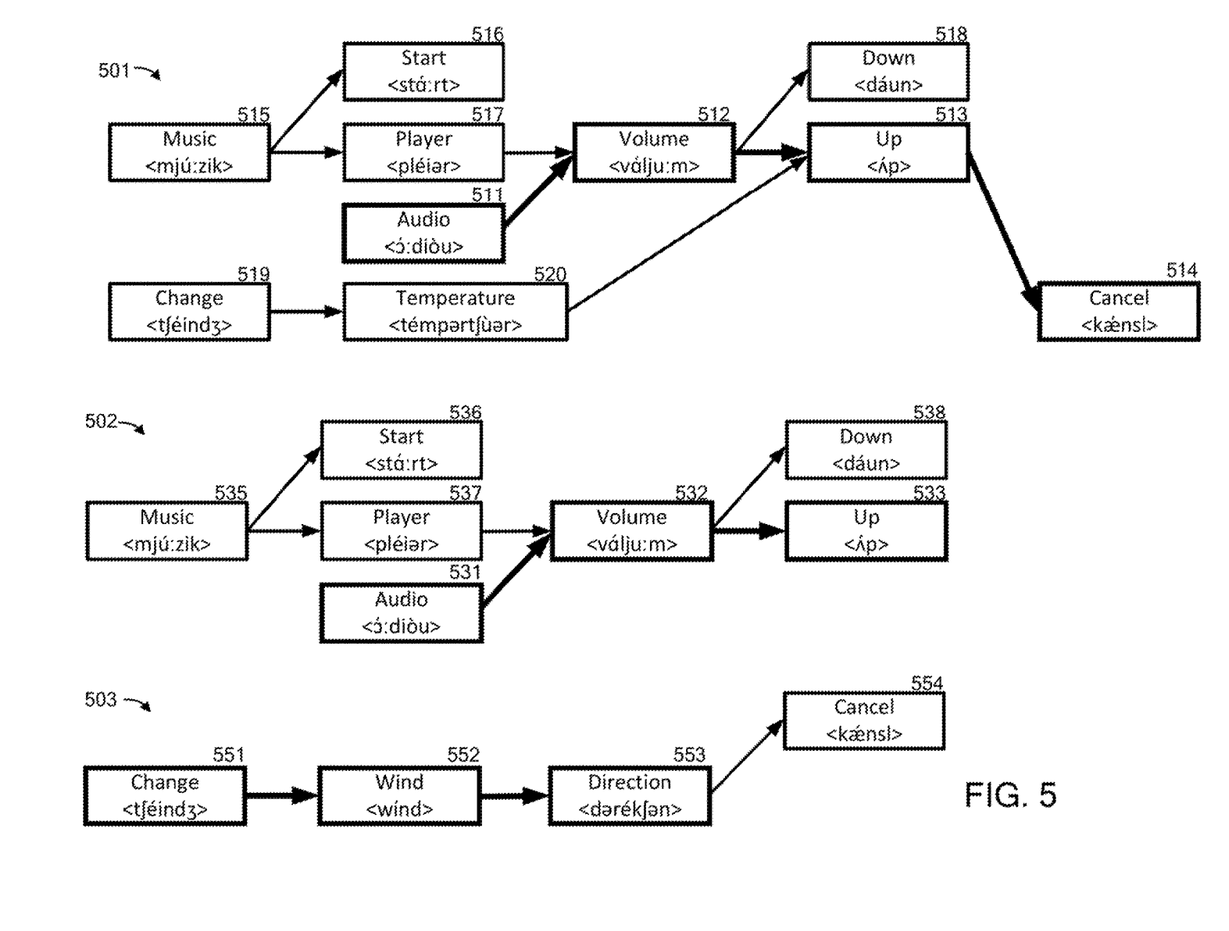
FIG. 5 illustrates a plurality of embodiments of a word graph constructed in the ASR system.

In step 205, the computer 101 constructs, by utilizing the ASR system, a word graph 294 with the plurality of texts obtained in step 204 for each of the test sentences. In one embodiment, the computer 101 may consider a DP matching based on a minimal criterion of character edit distance, such as Levenshtein distance, and further a minimal criterion of phoneme distance when a word graph is constructed. The word graph 294 is generated for each test sentence of the test sentences 291. The word graph 294 may be a word-phone graph, i. e. a word graph associated with phoneme. The word graph 294 reflects the results of the variation of speech data generated from a test sentence of the test sentences 291. Each word in the word graph 294 corresponds to each of the words defined in the pronunciation lexicon. Even if there is a recognition error, a desired effect of an embodiment of the present invention is obtained. This is because a word in the word graph 294 is present in words registered in the lexicons. Some embodiments of the word graph will be shown in FIGS. 5A, 5B and 5C mentioned below.

The computer 101 may store the word graph 294 into a storage 294, such as the disk 108 described in FIG. 1. The storage 294 may be the same or different with the storage 291, the storage 292, or the storage 293.

In step 206, the computer 101 determines whether or not all or parts of words in a test sentence of the test sentences are present in a path of the word graph 294 derived from the test sentence and constructed in step 205.

In a case where all of the words in a test sentence of the test sentences are present in a path of the word graph derived from the test sentence, the computer 101 judges that all of the words in the test sentence are correctly accepted in the ASR system. Meanwhile, in a case where parts of words in a test sentence of the test sentences are present in a path of the word graph derived from the test sentence, the computer 101 judges that the matching parts of the words in the test sentence are correctly accepted in the ASR system.

In step 207, the computer 101 ends the process of an embodiment of the present invention for testing words defined in a pronunciation lexicon used in an ASR system.

In alternative embodiments, each step or some steps of the steps 202 to 206 may be performed in one or more different computers, such as physically different computer(s) or different virtual machine (s) in one or more servers.

Figure 3:
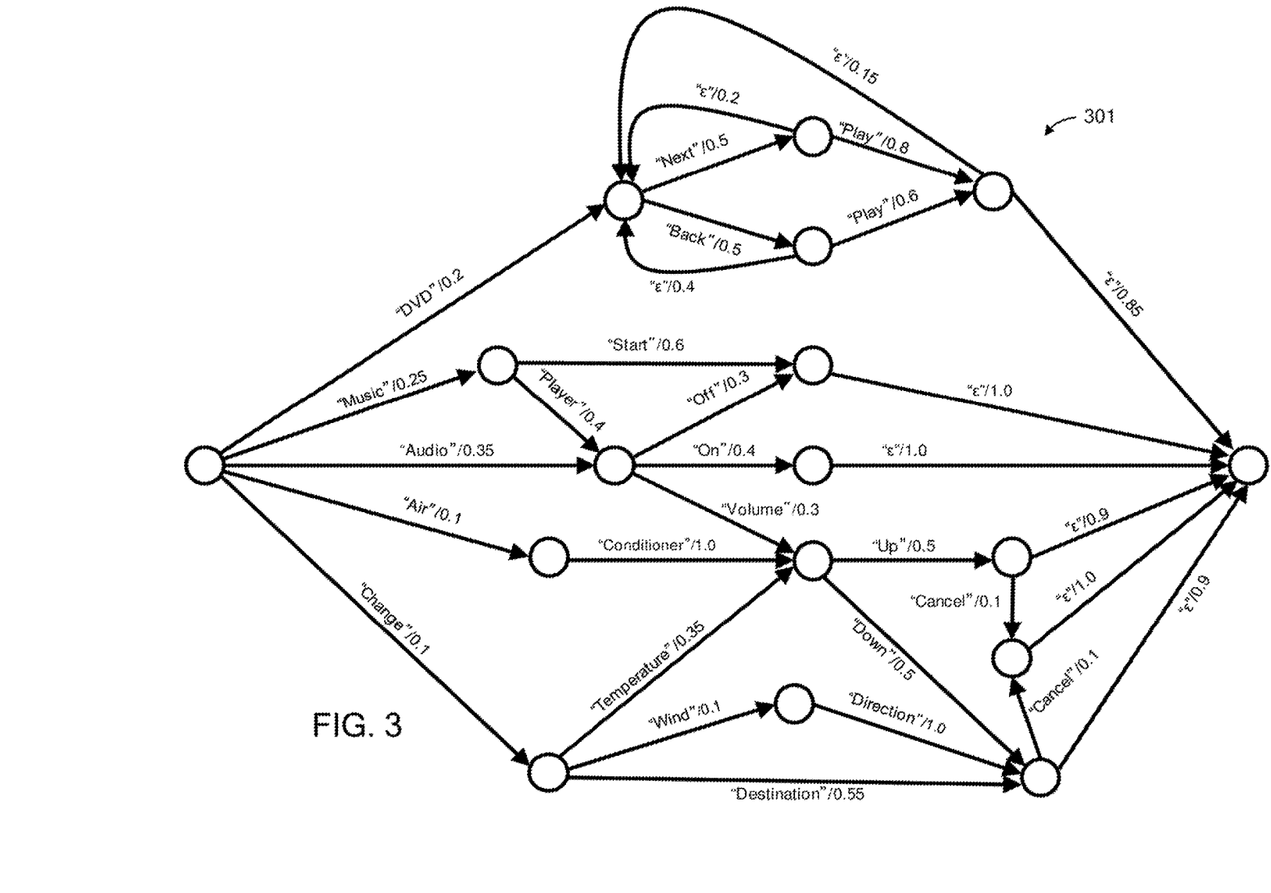
FIG. 3 illustrates one embodiment of a language model or a Finite State Transducer (FST) which may be used in an embodiment of the present invention.

With reference now to FIG. 3, FIG. 3 illustrates a language model or the FST.

FIG. 3 illustrates one embodiment of the FST which may be used in an embodiment of the present invention A FST 301 comprises a plurality of states (or nodes) and a plurality of edges between the nodes. Each of the words is associated with each of the edges in the FST. Each word has associated feature information obtained from the language model in the ASR system. A symbol epsilon, "ε", means a transition without any outputs.

In the FST 301, for example, "DVD"/0.2 means that "DVD" is a word in the FST and "0.2" means a transition probability.

The computer 101 generates a set of test sentences by using the FST described in FIG. 3 and on the basis of the following cover criteria. The cover criteria may be selected from, for example, a state cover criterion; a one-edge cover criterion; and a cover criterion of a succession of k edges pattern (k=2, - - - ). The one-edge cover criterion may be set to default cover criterion.

The computer 101 generates a set of test sentences, for example a set of test sentences A or B mentioned below.

The set of test sentences A based on a state cover criterion:
(<0.2,5> "DVD")(<0.5,2> "Next")(<0.8,2> "Play") (<0.6,2> " ");
(<0.2,5> "DVD")(<0.5,2> "Back")(<0.6,2> "Play")(<0.85, 2> " ");
(<0.25,5> "Music")(<0.6,2> "Start")(<1,0,1> " ");
(<0.25,5> "Music")(<0.4>,2> "Player")(<0.4,3> "On") (<1.0,1> " ");
(<0.1,5> "Air")(<1.0,2> "Conditioner")(<0.5,2> "Up") (<0.9,2> " "); and
(<0.1,5> "Change")(<0.35,3> "Wind")(<1.0,1> "Direction")(<0.1,2> "Cancel")(<1.0,1> " ")

The set of the test sentences A is generated based on the state cover criterion. The set of the test sentences A shows that the each of the generated test sentences comprises a set of the feature information, <a transition probability, the transition number, or a combination thereof> and <a word>, one of the word strings covering all states in the FST 301.

The set of test sentences B based on a one-edge cover criterion:
(<0.2,5> "DVD")(<0.5,2> "Next")(<0.8,2> "Play")(<0.15, 2>" ")(<0.5,2> "Next"))(<0.8,2> "Play")(<0.85,2> " ");
(<0.2,5> "DVD")(<0.5,2> "Back")(<0.4,2> " ") (0.5,2> "Next")(<0.2,2>" ")(<0.5,2> "Back")(<0.6,2> "Play") (<0.85,2> " ");
(<0.25,5> "Music")(<0.6,2> "Start")(<1,0,1> " ");
(<0.25,5> "Music")(<0.4>,2> "Player")(<0.4,3> "On") (<1.0,1> " ");
(<0.25,5> "Music")(<0.4>,2> "Player")(<0.3,3> "Off")(<1, 0,1> " ");
(<0.35,5> "Audio")(<0.3,3> "Volume")(<0.5,2> "Up") (<0.1,2> "Cancel")(<1.0,1> " ");
(<0.1,5> "Air")(<1.0,2> "Conditioner")(<0.5,2> "Up") (<0.9,2> " ");
(<0.1,5> "Air")(<1.0,2> "Conditioner")(<0.5,2> "Down") (<0.9,2> " ")(<0.9,2> " ");

(<0.1,5> "Change")(<0.35,3> "Wind")(<1.0,1> "Direction")(<0.1,2> "Cancel")(<1.0,1> " ");
(<0.1,5> "Change")(<0.55,3> "Destination")(<0.1,2> "Cancel")(<1.0,1> " "); and
(<0.1,5> "Change")(<0.35,3> "Temperature")(<0.5,2> "Up")(<0.9,2> " ")

The set of the test sentences B is generated based on the one-edge cover criterion. The set of the test sentences B shows that each of the generated test sentences comprises a set of the feature information, <a transition probability, the transition number, or a combination thereof> and <a word>, one of the word strings covering all edges in the FST 301. The set of the test sentences B also covers epsilon transition.

Figure 4:
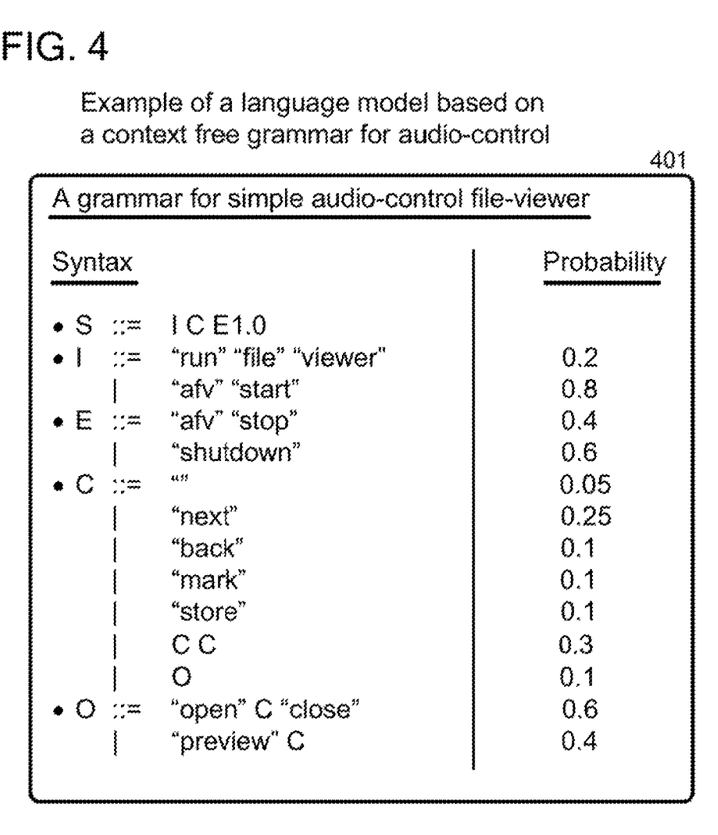
FIG. 4 illustrates one embodiment of a language model or a context free grammar for audio-control which may be used in an embodiment of the present invention.

With reference now to FIG. 4, FIG. 4 illustrates a language model or context free grammar for audio-control.

FIG. 4 illustrates one embodiment of the context free grammar for audio-control which may be used in an embodiment of the present invention.

The view 401 shows that a grammar for simple audio-control file viewer. The context free grammar comprises a set of syntax or rule and a corresponding probability.

In the view 401, production rules in the CFG correspond to five items. For example, the first rule is S::=ICE, and the second rule is I::="run" "file" "viewer"|"afv" "start". For example, in the first rule, there is only one alternative, an expansion to ICE for S. For example, in the second rule, there are two alternatives: one is an expansion of I to character strings, "run" "file" "viewer"; and another is an expansion of I to character strings, "afv" "start".

When the partial structures of the CFG are taken as rules, a set of the test sentences covering all of the partial structures is a set of the test sentences covering all rules. When the partial structures of the CFG are taken as alternatives of the rule, i. e. alternatives of an expansion of the nonterminal symbol of the grammar, a set of the test sentences covering all of the partial structures is a set of the test sentences generated by using all of the alternatives of the all rules, i. e. alternatives of an expansion of the nonterminal symbol of the grammar.

The computer 101 generates a set of test sentences by using the context free grammar for the audio-control of FIG. 4 and on the basis of the following cover criteria. The cover criteria may be selected from, for example, a production-rule cover criterion; and all-alternatives cover criterion. The all-alternatives cover criterion may be set to default cover criterion.

The computer 101 generates a set of test sentences, for example a set of test sentences C or D mentioned below.

The set of generated test sentences C based on a production-rule cover criterion:
(<0.8,2> "afv")(<1.0.1> "start")(<0.05,7> " ")(<0.6,2> "shutdown"); and
(<0.8,2> "afv")(<1.0,1> "start")(<0.06,7> "open")(<0.1,7> "mark") (<1.0,1> "close")
(<0.4,2> "afv") (<1.0,1> "stop")

The set of test sentences C is generated based on the production-rule cover criterion. The set of the test sentences C shows that each of the generated test sentences comprises a set of the feature information, <a choice probability, the number of choice, or a combination thereof> and <a word>, one of the word strings covering all of the rules in the CFG (401).

The set of generated test sentences D based on an all-alternatives cover criterion:
(<0.8,2> "afv") (<1.0.1> "start") (<0.05,7> " ")(<0.6,2> "shutdown");
(<0.8,2> "afv") (<1.0,1> "start") (<0.06,7> "open")(<0.1,7> "mark") (<1.0,1> "close")
(<0.4,2> "afv") (<1.0,1> "stop");
(<0.2,2> "run") (<1.0,1> "file") (<1.0,1> "viewer") (<0.075, 7> "next") (<0.018,7> "open")
(<0.1,7> "store")(<1.0,1> "close") (<0.6,2> "shutdown");
(<0.8,2> "afv") (<1.0.1> "start") (<0.075,7> "next") (<0.18, 7> "open") (<0.03,7> "back")
(<0.018,7> "open")(<0.1,7> "mark") (<1.0,1> "close") (<1.0,1> "close") (<0.6,2> "shutdown"); and
(<0.8,2> "afv") (<1.0.1> "start") (<0.075,7> "next") (<0.12, 7> "preview") (<0.03,7> "back")
(<0.018,7> "open")(<0.1,7> "mark") (<1.0,1> "close") (<0.6,2> "shutdown");

The set of test sentences D is generated based on the all-alternatives cover criterion. The set of test sentences D shows that the each of generated test sentences comprises a set of the feature information, <a choice probability, the number of choice, or a combination thereof> and <a word>, one of the word strings covering all of the variations of the rule in the CFG 401.

With reference now to FIG. 5, FIG. 5 illustrates a plurality of embodiments of a word graph constructed in the ASR system.

In one embodiment, FIG. 5 illustrates a word-phone graph 501. Assumed that the test sentence generated in step 202 of FIG. 2 is "Audio volume up cancel". The computer 101 generates variations of speech data corresponding to the test sentence and, then, recognizes the variations of speech data. Assumed that the recognition results generated from the test sentence comprise (1) "Music start"; (2) "Music player volume up"; (3) "Audio volume down"; and (4) "Change temperature up cancel". The computer 101 constructs the word-phone graph 501 by using the multiple results.

The computer 101 determines whether or not all or parts of words in the test sentence are present in a path of the word-phone graph 501. The word-phone graph 501 shows that all of the words, "Audio", "Volume" "Up" and "Cancel", in the test sentence are present in a path 511, 512, 513 and 514 of the word-phone graph 501. Accordingly, it is considered that all of the words, "Audio", "Volume" "Up" and "Cancel", in the test sentence are correctly accepted in the ASR system.

In another embodiment, FIG. 5 illustrates a word-phone graph 502. Assumed that the test sentence generated in step 202 of FIG. 2 is "Audio volume up cancel". The computer 101 generates variations of speech data corresponding to the test sentence and, then, recognizes the variations of speech data. Assumed that the recognition results generated from the test sentence comprise (1) "Music start"; (2) "Music player volume up"; and (3) "Audio volume down". The computer 101 constructs the word-phone graph 502 by using the multiple results.

The computer 101 determines whether or not all or parts of words in the test sentence are present in a path of the word-phone graph 502. The word-phone graph 502 shows that parts of the words, "Audio", "Volume" and "Up", in the test sentence are present in a path 531, 532 and 533 of the word-phone graph 502. Accordingly, the computer 101 judges that the parts of the words in the test sentence are correctly accepted in the ASR system. Accordingly, it is considered that parts of the words, "Audio", "Volume" and "Up" in the test sentence are correctly accepted in the ASR system.

In further another embodiment, FIG. 5 illustrates and a word-phone graph 503. Assumed that the test sentence generated in step 202 of FIG. 2 is "Change wind direction".

The computer 101 generates variations of speech data corresponding to the test sentence and, then, recognizes the variations of speech data. Assumed that the recognition results generated from the test sentence comprise (1) "Change wind direction<dərékʃən>"; and (2) "Change wind direction<dərékʃən> cancel". Two pronunciations for the word "direction" are defined in a lexicon as <dərékʃən> and <dáirékʃən>. The computer 101 constructs the word-phone graph 503 by using the multiple results. Only the pronunciation <dərékʃən> appears in the word-phone graph 503 and the Pronunciation <dáirékʃən> does not appear in it.

The computer 101 determines whether or not all or parts of the words in the test sentence are present in a path of the word-phone graph 503. In this case, the word, "Change", and "Wind", and the word "direction<dərékʃən>" is regarded as accepted; meanwhile the word "direction<dáirékʃən>" which has different pronunciation is not regarded as accepted.

In the further another embodiment, if the recognition results further comprise (3) "Change wind direction <dáirékʃən> cancel" 542-2, the word, "Change", and "Wind", and the both "direction<dərékʃən>" and "direction<dáirékʃən>" are regarded as accepted.

Figure 6:
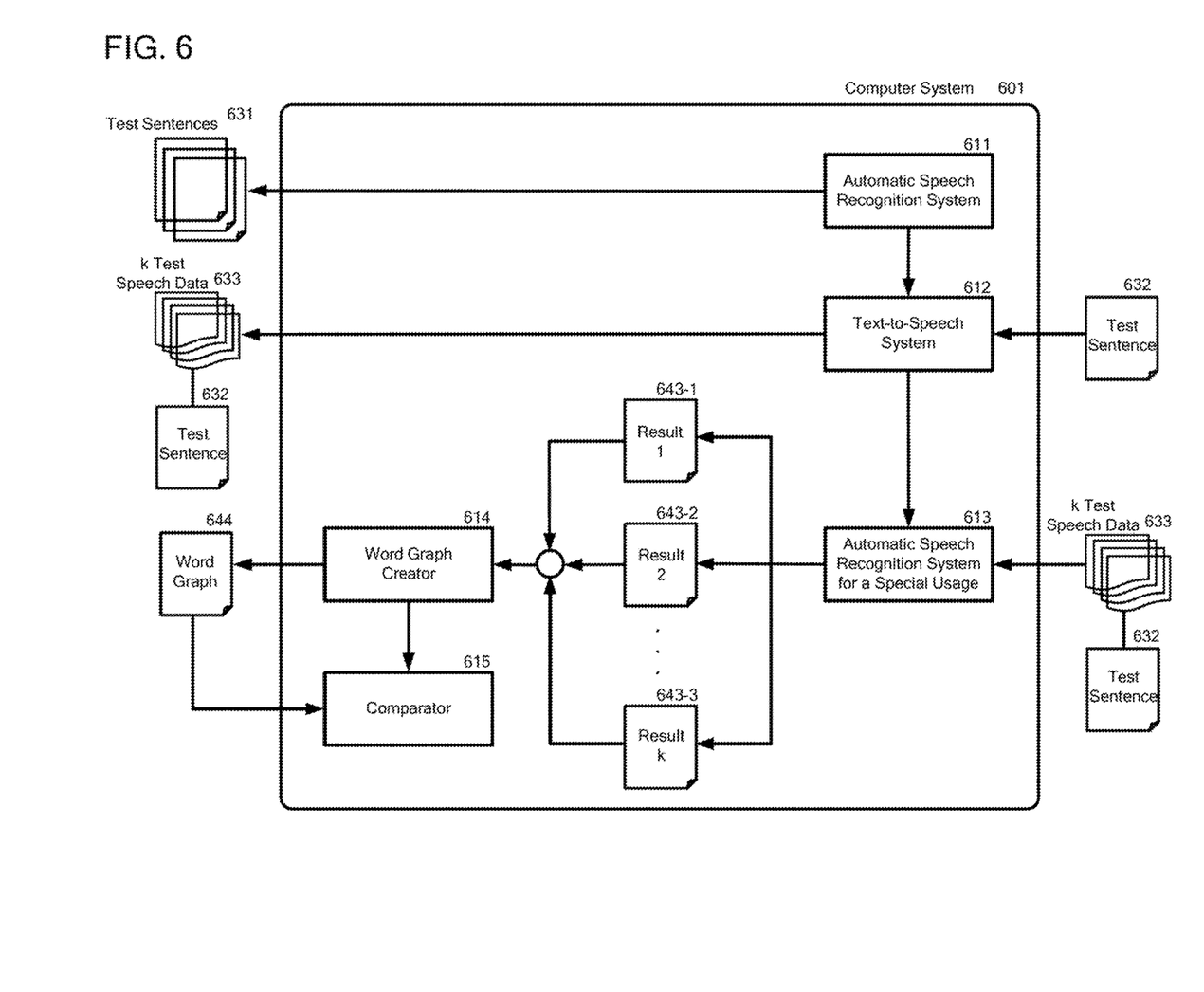
FIG. 6 illustrates one embodiment of an overall functional block diagram of a computer hardware used in an embodiment of the present invention comprising the ASR system, a text-to-speech (TTS) system, a word graph creator and a comparator.

With reference now to FIG. 6, FIG. 6 illustrates one embodiment of an overall functional block diagram of a hardware used in an embodiment of the present invention comprising the ASR system and the TTS system.

The computer system 601 corresponds to the computer 101 described in FIG. 1.

The computer system 601 comprises the ASR system 611, the TTS system 612, an ASR system for a special usage 613, a word graph creator 614, and a comparator 615. The ASR system 611 may be the same or different with the ASR system for a special usage 613. The special usage means that the ASR system is customized for a specific environment, such as a call center. The ASR system 611, the TTS system 612, the ASR system for a special usage 613, a word graph creator 614, and comparator 615 may be implemented as a hardware, such as IC chip, or smart, chip, or integrated circuit card, or software, such as module or plug-in or add-in software, or a combination thereof.

The ASR system 611 performs step 202 of FIG. 2. The ASR system 611 generates a plurality of test sentences 631 together with feature information obtained from the language model. The ASR system 611 generates a plurality of test sentences 631 by, for example, a naïve algorithm or an algorithm which is publicly known in the art.

The TTS system 612 performs step 203 of FIG. 2. The TTS system 612 obtains a test sentence 632 from the ASR system 611 or storage and generates variations of speech or k test speech data 633 from the test sentence 632 of the test sentences 631 and associates the generated k test speech data 633 with the test sentence 632. For each test sentence 632 of the test sentences 631, the TTS system 612 generates k test speech data 633 associated with the test sentence 632 from which the k test speech data 633 is generated. More detailed description of the TTS system 612 will be provided below in reference to FIGS. 7A and 7B.

The ASR system for a special usage 613 performs step 204 of FIG. 2. The ASR system for a special usage 613 obtains the k test speech data 633 from the TTS system 612 or storage and recognizes the k test speech data 633 associated with the test sentence 632 in order to obtain a plurality of texts or results 1 to k (643-1, 643-2, . . . , 643-3).

The word graph creator 614 performs step 205 of FIG. 2. The word graph creator 614 obtains results 1 to k (643-1, 643-2, . . . , 643-3) from the ASR system for a special usage 613 or a storage and constructs a word graph 294 by using the results 1 to k (643-1, 643-2, . . . , 643-3). For each test sentence 632 of the test sentences 631, the word graph creator 614 constructs the word graph 294.

The comparator 615 performs step 206 of FIG. 2. The comparator 615 obtains the word graph from the word graph creator 614 or a storage and determines whether or not all or parts of the words in a test sentence 632 of the test sentences 631 are present in a path of the word graph 644 derived from the test sentence 632. In a case where all of the words in a test sentence 632 of the test sentences 631 are present in a path of the word graph 644 derived from the test sentence 632, the comparator 615 judges that all of the words in the test sentence are correctly accepted in the ASR system. Meanwhile, in a case where parts of the words in the test sentence 632) of the test sentences 631 are present in a path of the word graph 644 derived from the test sentence 632, the comparator 615 judges that the matching parts of the words in the test sentence 632 are correctly accepted in the ASR system.

Figure 7A:
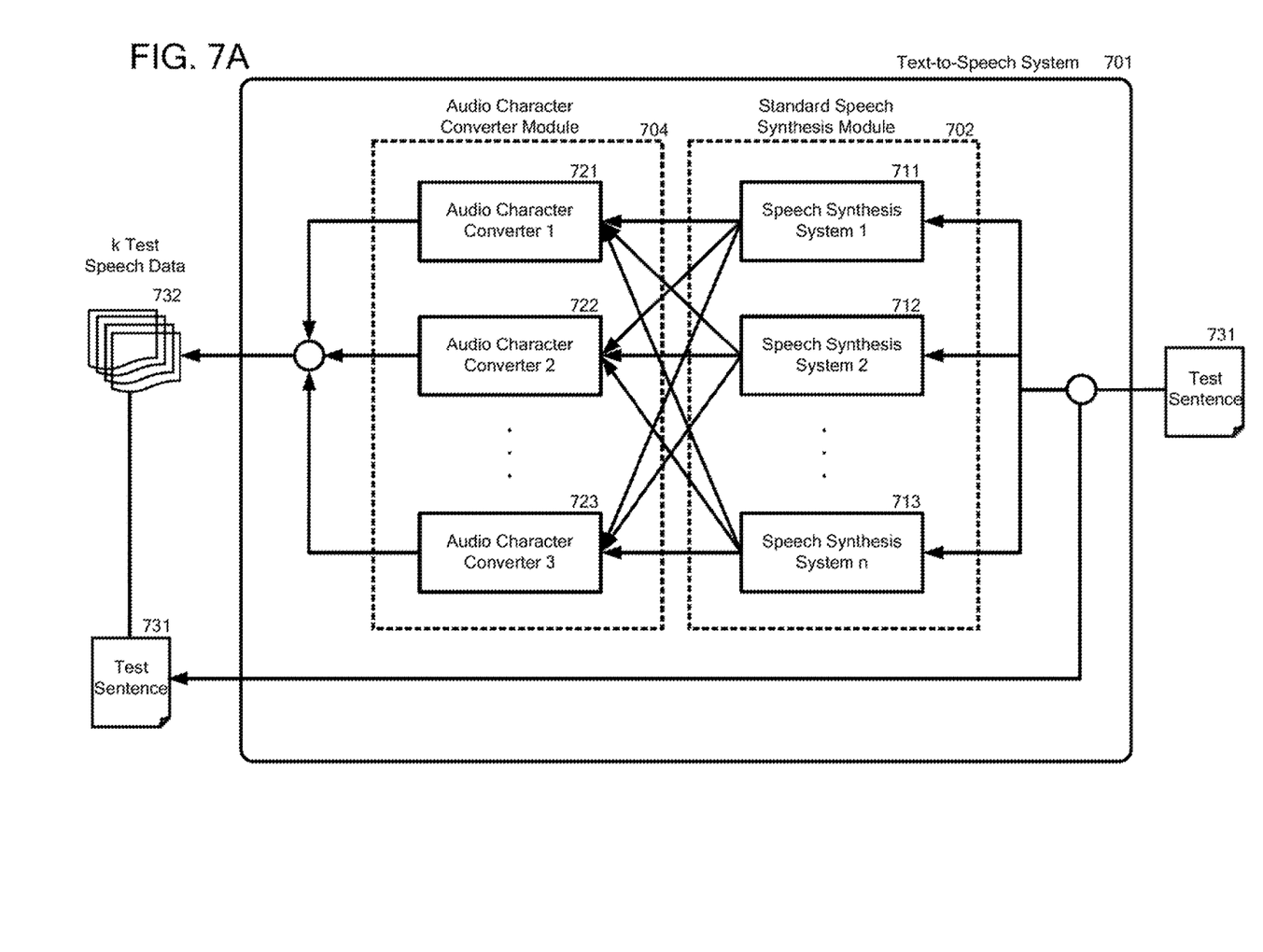
FIG. 7A illustrates one embodiment of a functional block diagram of the TTS system.
Figure 7B:
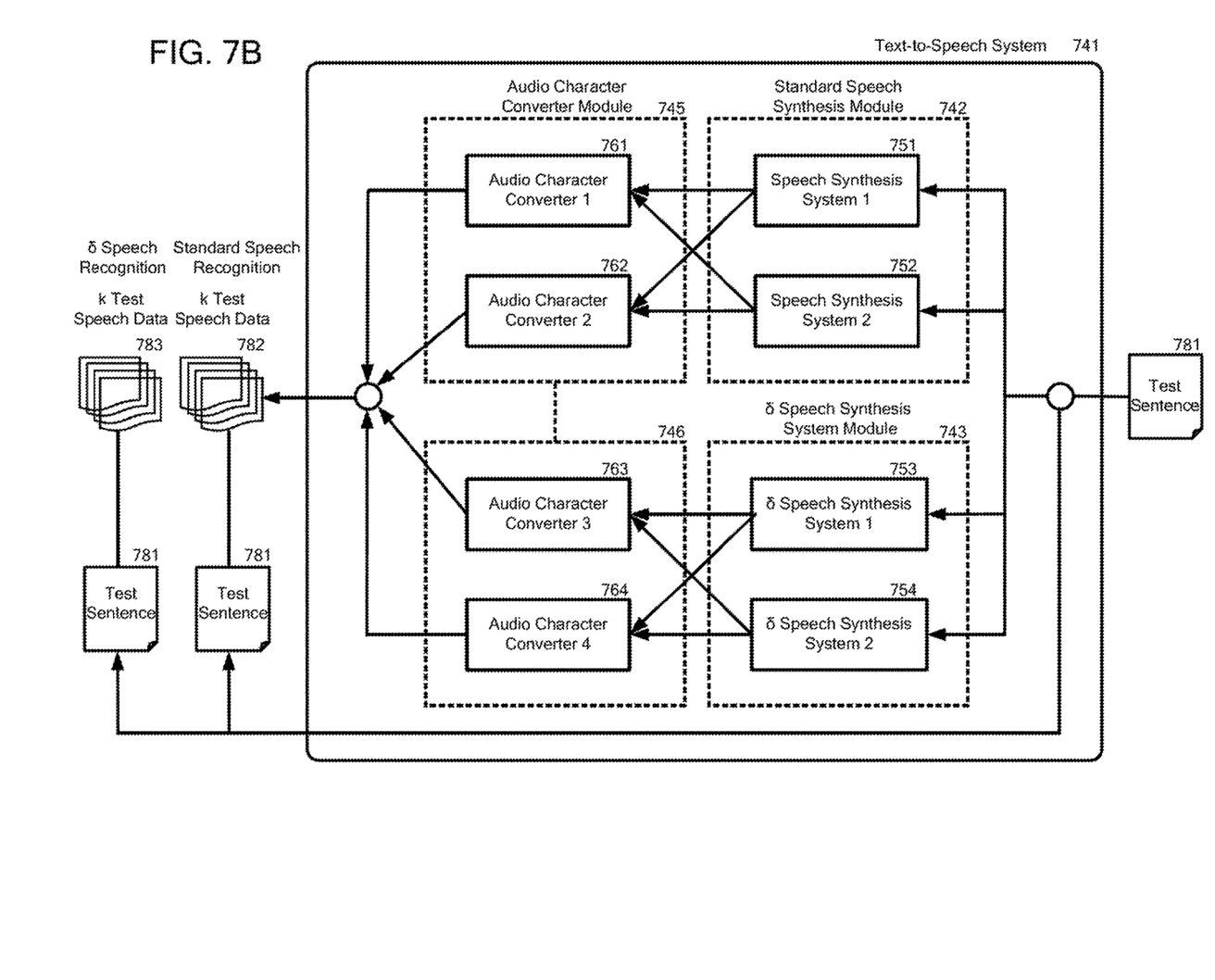
FIG. 7B illustrates one embodiment of a functional block diagram of the TTS system.

With reference now to FIGS. 7A and 7B, FIGS. 7A and 7B illustrate different embodiments of a functional block diagram of the TTS system.

FIG. 7A illustrates that a standard speech synthesis module 702 in a TTS system (701) is utilized for generating a variation of speech data or k test speech data 732 corresponding to a test sentence 731 of the test sentences. The TTS system 701 corresponds to the TTS system 612 of FIG. 6. The TTS system 701 comprises the standard speech synthesis module 702, an audio character converter module 704 or a combination thereof. The audio character converter module 704 is the one used for the speech recognition system under the test.

The standard speech synthesis module 702 comprises at least one of speech synthesis systems, such as a speech synthesis system 1 711, a speech synthesis system 2 712 and a speech synthesis system n 713. Each of the speech synthesis systems 711, 712, 713 generates standard speech synthesis data from the test sentence 731. In one embodiment, each of the speech synthesis systems 711, 712, 713 is used to convert the test sentence 731 to different speech synthesis data, such as male voice data, female voice data, child voice data, high-tone voice data or soft voice data.

The audio character converter module 704 comprises at least one of audio character converters, such as an audio character converter 1 721, an audio character converter 2 722 and an audio character converter n 723. Each of the audio character converters 721, 722, 723 is used to convert the speech synthesis data from each or corresponding speech synthesis systems 711, 712, 713 to test speech data 732 in such a way that the speech synthesis data is adopted to a specific environment, such as a call center, a car, a room, for example, a meeting room, a bath, or a music hall. This enables the audio character converters 721, 722, 723 to generate the test speech data 732 which match a variety of ideal sound environment assumed by the ASR system. In one embodiment of the audio character converter module 704 is described in, for example, US2014337026 (A1), the entire disclosure of which is incorporated by reference as if fully set forth herein. US2014337026 (A1) discloses a method and system for generating training data for a target domain using speech data of a source domain: the training data generation method including reading out a Gaussian mixture model (GMM) of a target domain trained with a clean speech data set of the target domain; mapping, by referring to the GMM of the target domain, a set of source domain speech data received as an input to the set of target domain speech data on a basis of a channel characteristics of the target domain speech data; and adding a noise of the target domain to the mapped set of source domain speech data to output a set of pseudo target domain speech data and discloses to the effect that a technique for simulating speech data of a target domain by reusing abundantly existing speech data under different acoustic environments like speech data on the Internet.

The TTS system 701 generates k test speech data (732) from the test sentence 731 and associates the generated k test speech data 732 with the test sentence 731.

If any one of the k test speech data 732 from the audio character converters 721, 722, 723 matches the test sentence 731, the TTS system 701 judges that that k test speech data 732 can be used for constructing a word graph in step 205 of FIG. 2.

FIG. 7B illustrates that a standard speech synthesis module 742 and aσspeech synthesis module 743 in a TTS system 741 are utilized for generating a variation of speech data or k test speech data 782, 783 corresponding to a test sentence 781 of the test sentences. The TTS system 741 corresponds to the TTS system 612 of FIG. 6. The TTS system 741 comprises the standard speech synthesis module 742, theσspeech synthesis module 743, audio character converter modules 745, 746, or a combination thereof. The audio character converter modules 745, 746 are the ones used for the speech recognition system under the test.

The standard speech synthesis module 742 comprises at least one of speech synthesis systems, such as a speech synthesis system 1 751 and a speech synthesis system 2 752. Each of the speech synthesis systems 1 751 and 2 752 generates standard speech synthesis data from the test sentence 781. In one embodiment, each of the speech synthesis systems 1 751 and 2 752 is used to convert the test sentence 731 to different speech synthesis data, such as a different speaker including male voice data, female voice data, child voice data, voice data with high fundamental frequency, or voice data uttered very softly.

The σspeech synthesis module 743 comprises at least one of speech synthesis systems, such as a σspeech synthesis system 1 753 and a σspeech synthesis system 2 754. In one embodiment, each of theσspeech synthesis systems 1 753 and 2 754 generates modified speech synthesis data from the standard speech synthesis data by using a variation function, σ. In another embodiment, each of theσspeech synthesis systems 1 753 and 2 754 modifies the standard speech synthesis from the speech synthesis systems 1 751 and 2 752 by using a variation function, σ. The variation function, σ, is defines as follows: wherein the test data 781 associated with the feature information is defined as "t":

N(t): The variation function, N(t), is used for converting "t" to standard speech synthesis data "d" or speech synthesis data "d2 in a most natural fashion;

H[k,p,c](t): The variation function, H[k,p,c](t), is used for converting a word or words in "t" having the transition probability of the feature information being "p" or less and the transition number of the feature information being "c" or more to speech data "d" which is modified such that a fundamental frequency of the speech data corresponding t the word(s) is higher k or lower k than that of the standard speech data;

L[s,p,c](t): The variation function, L[s,p,c](t), is used for converting a word or words in "t" having the transition probability of the feature information being "p" or less and the transition number of the feature information being "c" or more to speech data "d" which is modified such that a duration of the word is longer s or shorter s than that of the standard speech data;

I[s,p,c](t): The variation function, I[s,p,c](t), is used for converting a word or words in "t" having the transition probability of the feature information being "p" or less and the transition number of the feature information being "c" or more to speech data which is modified such that the duration before or after the word is longer s or shorter s than that of the standard speech data; or any other perturbative variation functions that may be creating a variation of the speech data may be used.

The audio character converter modules 745, 756 comprise at least one of audio character converters, such as an audio character converter 1 761, an audio character converter 2 762, an audio character converter 3 763, and an audio character converter 4 764. Each of the audio character converters 761, 762, 763, 764 is used to convert the speech synthesis data from each or corresponding speech synthesis systems 751, 752, 753, 754 to test speech data 782, 783 in such a way that the speech synthesis data is adopted to a specific environment, such as a call center, a car, a room, for example, a meeting room, a bath, or a music hall. This enables the audio character converters 761, 762, 763, 764 to generate the test speech data 782, 783 which match a variety of ideal sound environment assumed by the ASR system.

The TTS system 741 generates, by utilizing standard speech synthesis module 742, k test speech data 782 from the test sentence 781 and associates the generated k test speech data 782 with the test sentence 781. Further, the TTS system 741 generates, by utilizing σ speech synthesis module 743, k test speech data 783 from the test sentence 781 and associates the generated k test speech data 783 with the test sentence 781.

If any one of the speech data 782, 783 from the audio character converters 761, 762, 763, 764 matches the test sentence 781, the TTS system 741 judges that k test speech data 782, 783 can be used for constructing a word graph in step 205 of FIG. 2.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

What is claimed is:

1. A computer-implemented method for testing words defined in a pronunciation lexicon used in an automatic speech recognition system, comprising:
    obtaining a plurality of test sentences which can be accepted by a language model used in the automatic speech recognition system, the test sentences including a plurality of the words defined in the pronunciation lexicon;
    obtaining variations of speech data corresponding to each of the test sentences;
    obtaining a plurality of texts generated by recognizing the variations of speech data;
    constructing a word graph, using the plurality of texts, for each of the test sentences, wherein one or more words in the word graph correspond to one or more words defined in the pronunciation lexicon; and
    determining whether all, or parts of words in a test sentence of the test sentences are present in a path of the word graph derived from the test sentence.

2. The method according to claim 1, wherein the test sentences cover all of partial structures of the language model.

3. The method according to claim 2, wherein the partial structures of the language model are edges in Finite State Transducer, or production rules and alternatives of each rule in Context Free Grammar.

4. The method according to claim 3, wherein each alternative corresponds to a right-hand side choice of the production rules.

5. The method according to claim 1, wherein each of the test sentences is generated together with feature information obtained from the language model and wherein a number of the variations of speech data is determined according to corresponding feature information.

6. The method according to claim 5, wherein the feature information comprises a number of transitions to other words in the language model, a transition probability among words in the language model, or a combination thereof.

7. The method according to claim 1, further comprising, in a case where all of the words in a test sentence of the test sentences are present in a path of the word graph derived from the test sentence, judging whether all of the words in the test sentence are correctly accepted in the automatic speech recognition system.

8. The method according to claim 1, further comprising, in a case where parts of words in a test sentence of the test sentences are present in a path of the word graph derived from the test sentence, judging whether matching parts of the words in the test sentence are correctly accepted in the automatic speech recognition system.

9. A computer system for testing words defined in a pronunciation lexicon, comprising:
an automatic speech recognition system (ASR) for using the pronunciation lexicon, the ASR system configured to generate a plurality of test sentences which can be accepted by a language model used in the ASR system, the test sentences including a plurality of the words defined in the pronunciation lexicon; and
a text-to-speech system configured to generate variations of speech data corresponding to each of the test sentences;
wherein the automatic speech recognition system is further configured to:
obtain a plurality of texts generated by recognizing the variations of speech data,
construct a word graph, using the plurality of texts, for each of the test sentences, wherein one or more words in the word graph correspond to one or more words defined in the pronunciation lexicon, and
determine whether all, or parts of words in a test sentence of the test sentences are present in a path of the word graph derived from the test sentence.

10. The computer system according to claim 9, wherein the test sentences cover all of partial structures of the language model.

11. The computer system according to claim 10, wherein the partial structures of the language model are edges in Finite State Transducer, or production rules and alternatives of each rule in Context Free Grammar.

12. The computer system according to claim 9, wherein each of the test sentences is generated together with feature information obtained from the language model and a number of the variations of speech data is determined according to corresponding feature information.

13. The computer system according to claim 12, wherein the feature information comprises a number of transitions to other words in the language model, a transition probability among words in the language model, or a combination thereof.

14. The computer system according to claim 9, in a case where all of the words in a test sentence of the test sentences are present in a path of the word graph derived from the test sentence, the system further judges that all of the words in the test sentence are correctly accepted in the automatic speech recognition system.

15. A computer program product comprising a computer readable storage medium including computer usable code implemented in one more of computers, for testing words defined in a pronunciation lexicon used in an automatic speech recognition system, comprising:
computer usable code for:
obtaining a plurality of test sentences which can be accepted by a language model used in the automatic speech recognition system, the test sentences including a plurality of the words defined in the pronunciation lexicon;
obtaining variations of speech data corresponding to each of the test sentences;
obtaining a plurality of texts generated by recognizing the variations of speech data;
constructing a word graph, using the plurality of texts, for each of the test sentences, wherein one or more words in the word graph correspond to one or more words defined in the pronunciation lexicon; and
determining whether all, or parts of words in a test sentence of the test sentences are present in a path of the word graph derived from the test sentence.

16. The computer program product according to claim 15, wherein the test sentences cover all of partial structures of the language model.

17. The computer program product according to claim 16, wherein the partial structures of the language model are edges in Finite State Transducer, or production rules and alternatives of each rule in Context Free Grammar.

18. The computer program product according to claim 15, wherein each of the test sentences is generated together with feature information obtained from the language model and a number of the variations of speech data is determined according to corresponding feature information.

19. The computer program product according to claim 18, wherein the feature information comprises a number of transitions to other words in the language model, a transition probability among words in the language model, or a combination thereof.

20. The computer program product according to claim 15, further comprising computer usable code for, in a case where all of the words in a test sentence of the test sentences are present in a path of the word graph derived from the test sentence, judging whether all of the words in the test sentence are correctly accepted in the automatic speech recognition system.

* * * * *